United States Patent
Watanabe et al.

(10) Patent No.: US 11,454,647 B2
(45) Date of Patent: Sep. 27, 2022

(54) SCANNING TYPE PROBE MICROSCOPE AND CONTROL DEVICE FOR SCANNING TYPE PROBE MICROSCOPE

(71) Applicant: Shimadzu Corporation, Kyoto (JP)

(72) Inventors: Kazuma Watanabe, Kyoto (JP); Keita Fujino, Kyoto (JP); Masato Hirade, Kyoto (JP); Kenji Yamasaki, Kyoto (JP); Hideo Nakajima, Kyoto (JP); Yuichiro Ikeda, Kyoto (JP); Hiroshi Arai, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/261,116

(22) PCT Filed: Jul. 27, 2018

(86) PCT No.: PCT/JP2018/028215
§ 371 (c)(1),
(2) Date: Jan. 18, 2021

(87) PCT Pub. No.: WO2020/021698
PCT Pub. Date: Jan. 30, 2020

(65) Prior Publication Data
US 2021/0311091 A1   Oct. 7, 2021

(51) Int. Cl.
*G01Q 20/02* (2010.01)
(52) U.S. Cl.
CPC ................... *G01Q 20/02* (2013.01)
(58) Field of Classification Search
CPC ....................................... G01Q 20/02
USPC ................... 850/1, 2, 3, 4, 5, 6, 7, 8, 9
See application file for complete search history.

(56) References Cited

U.S. PATENT DOCUMENTS 11,054,441 B2 * 7/2021 Fujino ................... G01Q 20/02

FOREIGN PATENT DOCUMENTS

JP   2000-346782 A   12/2000

OTHER PUBLICATIONS

Written Opinion by the International Search Authority for PCT application No. PCT/JP2018/028215, dated Sep. 25, 2018, submitted with a partial translation.

\* cited by examiner

*Primary Examiner* — Nicole M Ippolito
(74) *Attorney, Agent, or Firm* — Muir Patent Law, PLLC

(57) ABSTRACT

A cantilever has a probe at a tip end. An optical system emits laser light to the cantilever and detects the laser light reflected by the cantilever. A measurement unit measures characteristics of a sample based on a displacement of the cantilever obtained by a change in a position of the laser light detected by the optical system. The laser light adjustment unit adjusts, when adjusting the optical axis of the laser light, a spot diameter of the laser light to be larger than the spot diameter when measuring the characteristics of a sample. The imaging unit captures an image of a range including the position of the probe when adjusting the optical axis of the laser light. The display unit displays the captured image.

11 Claims, 14 Drawing Sheets

SP (Spot diameter D2)
1 μm

SP (Spot diameter D2)
5 μm

SCANNING TYPE PROBE MICROSCOPE AND CONTROL DEVICE FOR SCANNING TYPE PROBE MICROSCOPE

TECHNICAL FIELD

The present invention relates to a scanning type probe microscope and also relates to a control device for a scanning type probe microscope.

BACKGROUND ART

In a scanning type probe microscope, a cantilever beam provided with a probe called "cantilever" is used. The deflection or the change in the vibration of the cantilever is converted into a change in the reflected light of the laser irradiated on the rear surface of the cantilever and detected by a photodetector. The photodetector detects the changes in the position, the intensity, the phase, and the like of the reflected light and converts them into various physical information (see, for example, Patent Document 1 (Japanese Unexamined Patent Application Publication No. 2000-346782).

In a scanning type probe microscope, since the reflected light of the laser is used, before the measurement, an optical axis adjustment of the laser light is required so that the laser light is correctly emitted to the rear surface of the cantilever. Since the cantilever is small, the tolerance for the adjustment is on the order of microns. As a manual optical axis adjustment is difficult and time-consuming, auto-adjustment scanning type probe microscopes are increasing.

In an optical axis auto-adjustment, the cantilever and the spot of the beam of the laser light are observed with an optical microscope, a CCD (Charge Coupled Device) imaging unit, or the like, and the optical component, the laser light source, or the cantilever is automatically moved so that the spot of the beam is emitted to the rear surface of the cantilever.

Prior Art Document

Patent Document

Patent Document 1: Japanese Unexamined Patent Application Publication No. 2000-346782

SUMMARY OF THE INVENTION

Problems to be Solved by the Invention

However, if the spot of the beam of the laser light is in a position that cannot be detected by the optical microscope or the CCD-imaging unit, the optical axis automatic-adjustment cannot be performed because the movement target and the movement direction cannot be specified.

Although it is possible to perform the adjustment by switching to a manual mode, the position of the spot of the beam is unknown. For this reason, it is required to start by moving the laser light source randomly to locate the position of the movement target, which makes the operation complex and inefficient.

Under the circumstances, it is an object of the present invention to provide a scanning type probe microscope capable of easily performing an optical axis adjustment and a control device of a scanning type probe microscope.

Means for Solving the Problem

A scanning type probe microscope according to one aspect of the present invention is provided with:

a cantilever provided on a tip end thereof with a probe; an optical system configured to emit laser light to the cantilever and detect the laser light reflected by the cantilever;

a measurement unit configured to measure characteristics of a sample based on a displacement of the cantilever obtained by a change in a position of the laser light detected by the optical system;

a laser light adjustment unit configured to adjust, when adjusting an optical axis of the laser light, a spot diameter of the laser light to be larger than the spot diameter when measuring the characteristics of the sample;

an imaging unit configured to capture an image of a range including a position of the probe when adjusting the optical axis of the laser light; and a display unit configured to display the image captured by the imaging unit.

With this, when adjusting the optical axis of the laser light, the spot diameter of the laser light is set to be larger than that when measuring the sample, which increases the probability that the spot of the laser light can be found in the captured image. Consequently, the user can perform the optical axis adjustment of the laser light while viewing the captured image.

A scanning type probe microscope according to another aspect of the present invention is provided with:

a cantilever provided on a tip end thereof with a probe;

an optical system configured to emit laser light to the cantilever and detect the laser light reflected by the cantilever;

a measurement unit configured to measure characteristics of a sample based on a displacement of the cantilever obtained by a change in a position of the laser light detected by the optical system;

a laser light adjustment unit configured to adjust, when adjusting an optical axis of the laser light, a spot diameter of the laser light to be larger than the spot diameter when measuring the characteristics of the sample;

an imaging unit configured to capture an image of a range including a position of the probe when adjusting the optical axis of the laser light;

an image processing unit configured to specify a position of a part or an entirety of the spot of the laser light in the image captured by the imaging unit; and an optical axis adjustment unit configured to adjust an optical axis of the laser light based on the specified position.

With this, when adjusting the optical axis of the laser light, the spot diameter of the laser light is set to be larger than that when measuring the sample. Therefore, by performing the image processing of the captured image, the position of the spot of the laser light can be specified in the captured image. Therefore, it is possible to automatically adjust the optical axis of the laser light based on the specified spot position of the laser light.

Preferably, the optical system includes a light source configured to emit laser light, a photodetector configured to detect the laser light, a first mirror configured to reflect the laser light emitted from the light source toward the cantilever, and a second mirror configured to reflect the laser light reflected by the cantilever toward the photodetector.

With this, in the configuration in which the optical system includes the light source, the photodetector, the first mirror, and the second mirror, it is possible to automatically adjust the light source of the laser light.

Preferably, the optical axis adjustment unit adjusts the optical axis of the laser light by moving the position of the light source based on the specified position.

With this, the optical axis of the laser light can be automatically adjusted by simply changing the position of the light source.

Preferably, the optical axis adjustment unit adjusts the optical axis of the laser light by moving the position of the cantilever based on the specified position.

With this, the optical axis of the laser light can be automatically adjusted by simply changing the position of the cantilever.

Preferably, the optical axis adjustment unit adjusts the optical axis of the laser light by moving the position of the first mirror based on the specified position.

With this, the optical axis of the laser light can be automatically adjusted by simply changing the position of the first mirror that reflects the laser light.

Preferably, the laser light adjustment unit adjusts intensity of the laser light when adjusting the optical axis of the laser light to be equal to or higher than a sensitivity limit of the imaging unit.

With this, it is possible to prevent the intensity of the laser light from becoming lower than the discernible sensitivity due to the excessively large spot of the beam of the laser light.

Preferably, the optical axis adjustment unit adjusts the optical axis of the laser light so that a position of the center of the spot of the laser light coincides with the position of a tip end of the cantilever in the image.

With this, the laser light is emitted to the tip end of the cantilever where the probe is attached. Therefore, it is possible to accurately detect the displacement of the cantilever due to the characteristics of the sample at the time of the measurement.

Preferably, after the adjustment, the laser light adjustment unit further adjusts the spot diameter of the laser light to be equal to the spot diameter when measuring the characteristics of the sample, and the optical axis adjustment unit adjusts the optical axis of the laser light such that the position of the center of the narrowed laser light coincides with the position of the tip end of the sample in the image.

With this, the optical axis of the laser light can be precisely adjusted. Preferably, the image processing unit specifies a position of the part or the entirety of the spot of the laser light based on a color of the pixel in the image.

With this, it is possible to locate the position of the spot of the laser light by finding the pixel of the color of the spot of the laser light from the image.

A control device for a scanning type probe microscope according to one aspect of the present invention controls a scanning probe microscope. The scanning probe microscope is provided with a cantilever provided on a tip end thereof with a probe, an optical system configured to emit laser light to the cantilever and detect the laser light reflected by the cantilever, a measurement unit configured to measure characteristics of a sample based on a displacement of the cantilever obtained by a change in a position of the laser light detected by the optical system, and an imaging unit configured to capture an image of a range including a position of the probe when adjusting the optical axis of the laser light. The control device includes a laser light adjustment unit configured to adjust, when adjusting an optical axis of the laser light, a spot diameter of the laser light to be larger than the spot diameter when measuring the characteristics of the sample, an imaging unit configured to capture an image of a range including a position of the probe when adjusting the optical axis of the laser light, an image processing unit configured to specify a position of a part or an entirety of the spot of the laser light in the image generated by the imaging unit, and an optical axis adjustment unit configured to adjust an optical axis of the laser light based on the specified position.

With this, when adjusting an optical axis of the laser light, a spot diameter of the laser light is adjusted to be larger than the spot diameter when measuring the characteristics of the sample. Therefore, it is possible to specify the spot position of the laser light in the captured image by performing the image processing of the captured image. The optical axis of the laser light can be automatically adjusted based on the specified spot position of the laser light.

Effects of the Invention

According to the present invention, the optical axis adjustment can be performed easily.

EMBODIMENTS FOR CARRYING OUT THE INVENTION

Hereinafter, some embodiments will be described with reference to the attached drawings.

First Embodiment

Figure 1:
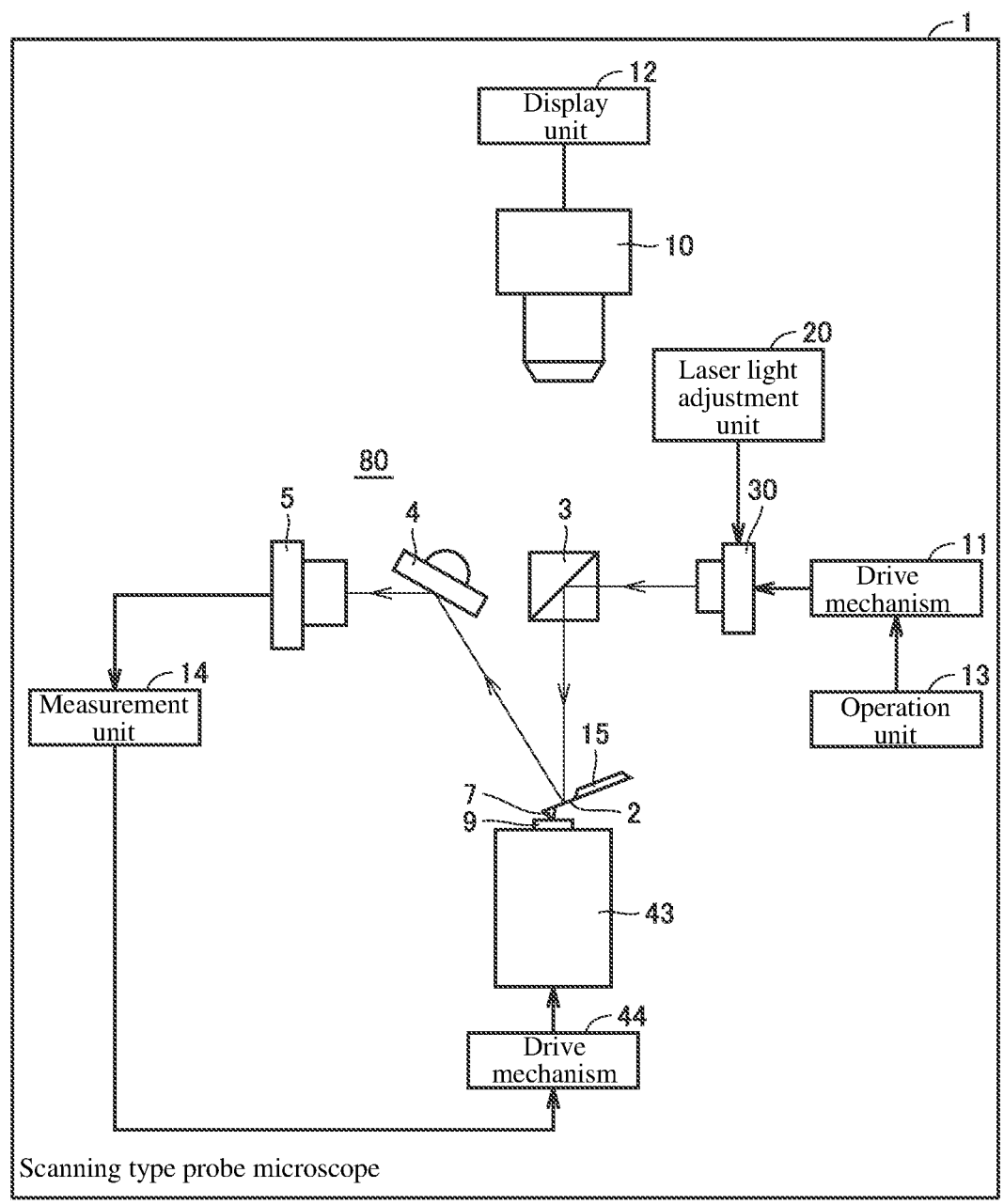
FIG. 1 is a diagram showing a configuration of a scanning type probe microscope 1 of a first embodiment.

FIG. 1 is a diagram showing a configuration of a scanning type probe microscope 1 according to a first embodiment.

The scanning type probe microscope 1 according to the first embodiment is provided with an imaging unit 10, a display unit 12, an optical system 80, a cantilever 2, a measurement unit 14, a drive mechanism 44, a scanner 43, a laser light adjustment unit 20, a drive mechanism 11, and an operation unit 13.

A cantilever 2 has a probe 7 at its tip end which is a free end. The sample 9 is arranged facing the probe 7. By the atomic force (attraction or repulsive force) between the probe 7 and the sample 9, the cantilever 2 is displaced. The sample 9 is placed on the scanner 43.

The optical system 80 emits laser light onto the back surface of the cantilever 2 and detects the laser light reflected by the back surface of the cantilever 2. The optical system 80 can detect the deflection of the cantilever 2. The optical system 80 is provided with a laser light source 30, a beam splitter 3 served as a first mirror, a reflector 4 served as a second mirror, and a photodetector 5. The laser light source 30 is constituted by a laser oscillator or the like for emitting laser light. The photodetector 5 is constituted by a photodiode or the like for detecting the incident laser light. The laser light emitted from the laser light source 30 is reflected by the beam splitter 3 and is incident on the cantilever 2. The laser light is reflected by the cantilever 2, is further reflected by the reflector 4, and is incident on the photodetector 5. The photodetector 5 detects the laser light, so that the displacement of the cantilever 2 can be measured.

The laser light adjustment unit 20 adjusts the spot diameter of the beam of the laser light of the laser light source 30 by adjusting the position of the focal point of the laser light of the laser light source 30. When adjusting the optical axis of the laser light, the laser light adjustment unit 20 adjusts the spot diameter of the laser light to be larger than a spot diameter when measuring the characteristics of the sample 9.

The drive mechanism 11 adjusts the optical axis of the laser light by changing the position of the laser light source 30.

The operation unit 13 receives operations of the drive mechanism 11 from the user. The measurement unit 14 measures the characteristics of the sample 9 based on the displacement of the cantilever 2 obtained by the change in the position of the laser light detected by the optical system 80. For example, the measurement unit 14 generates a force curve showing the time change of the acting force from the time change of the displacement of the cantilever 2. The measurement unit 14 sends a control signal for driving the scanner 43 to the drive mechanism 44.

The drive mechanism 44 drives the scanner 43 to change the relative positional relation between the sample 9 placed on the scanner 43 and the probe 7.

The imaging unit 10 images the range including the position of the probe 7 when adjusting the optical axis of the laser light. The imaging unit 10 is composed of an optical microscope, a CCD camera, a CMOS (Complementary Metal Oxide Semiconductor) camera, or the like.

The display unit 12 displays a captured image generated by the imaging unit 10. The display unit 12 is constituted by a liquid crystal display or the like.

Figure 2:
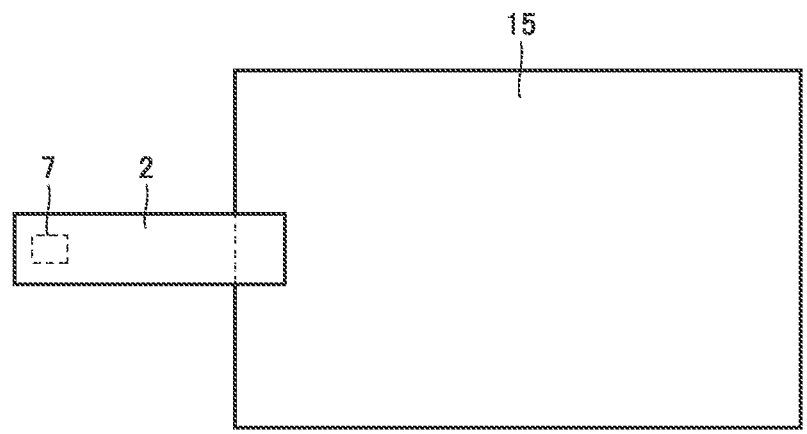
FIG. 2 is a diagram showing a probe 7, a cantilever 2, and a holder 15.

FIG. 2 is a diagram showing the probe 7, the cantilever 2, and the holder 15. As shown in FIG. 2, the probe 7 is attached to the tip end of the cantilever 2. The holder 15 is a member for supporting the cantilever 2.

Figure 3:
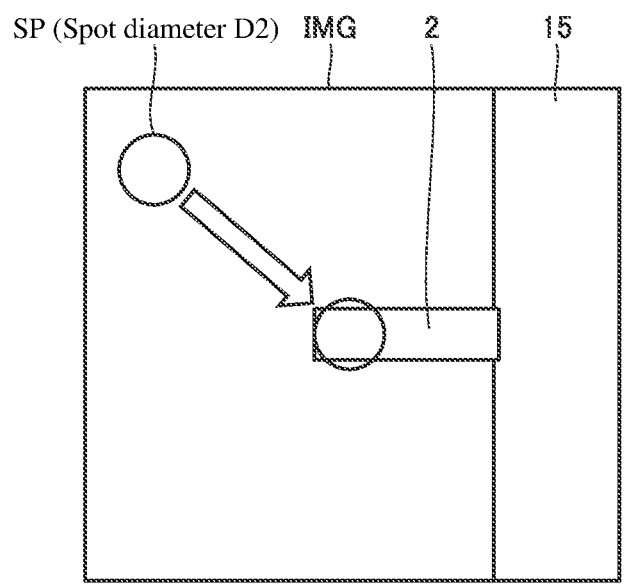
FIG. 3 is a diagram showing an example of a spot SP of a beam of a laser light source 30 at the time of a conventional optical axis adjustment of laser light.

FIG. 3 is a diagram showing an example of the spot SP of the beam of the laser light source 30 at the time of a conventional optical axis adjustment of laser light. In the example of FIG. 3, when the spot diameter of the beam of the laser light source 30 is set to be equal to that of the spot diameter D2 in actual use at the time of the optical axis adjustment, the spot SP of the beam is included in the captured image IMG.

Figure 4:
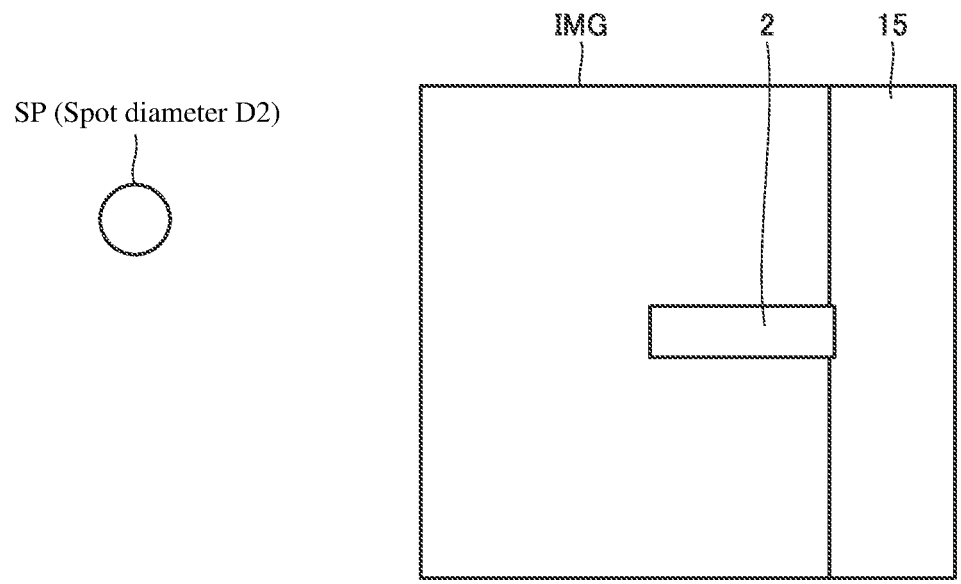
FIG. 4 is a diagram showing another example of a spot SP of a beam of a laser light source 30 at the time of a conventional optical axis adjustment of laser light.

FIG. 4 is a diagram showing another example of a spot SP of a beam of a laser light source 30 at the time of a conventional optical axis adjustment of laser light. In the example of FIG. 4, when the spot diameter of the beam of the laser light source 30 is set to be equal to that of the spot diameter D2 in actual use at the time of the optical axis adjustment, the spot SP of the beam is not included in the captured image IMG. Since the spot diameter of the beam is small, there occurs a case in which the spot SP of the beam is included in the captured image IMG and a case in which the spot SP of the beam is not included.

Figure 5:
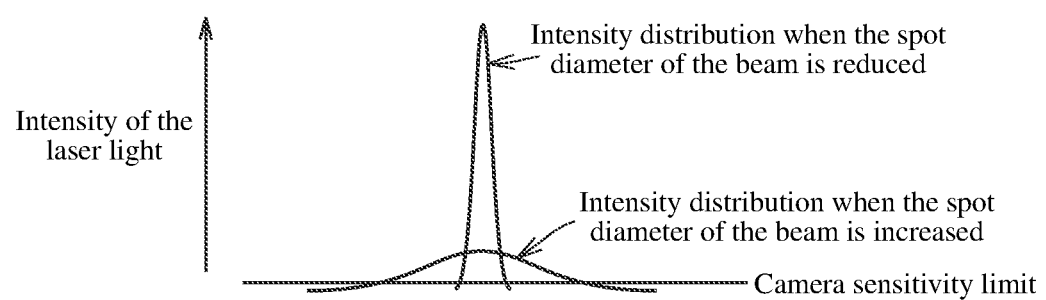
FIG. 5 is a diagram showing a relation between a spot diameter of a laser beam and intensity of laser light.

FIG. 5 shows the relation between the spot diameter of the beam of the laser light and the intensity of the laser light.

As shown in FIG. 5, the larger the spot diameter of the beam, the lower the intensity of the laser light. In this embodiment, the spot diameter D1 of the laser light at the time of the optical axis adjustment is set as large as possible on the condition that the intensity of the laser light becomes higher than the sensitivity limit of the imaging unit 10.

Figure 6:
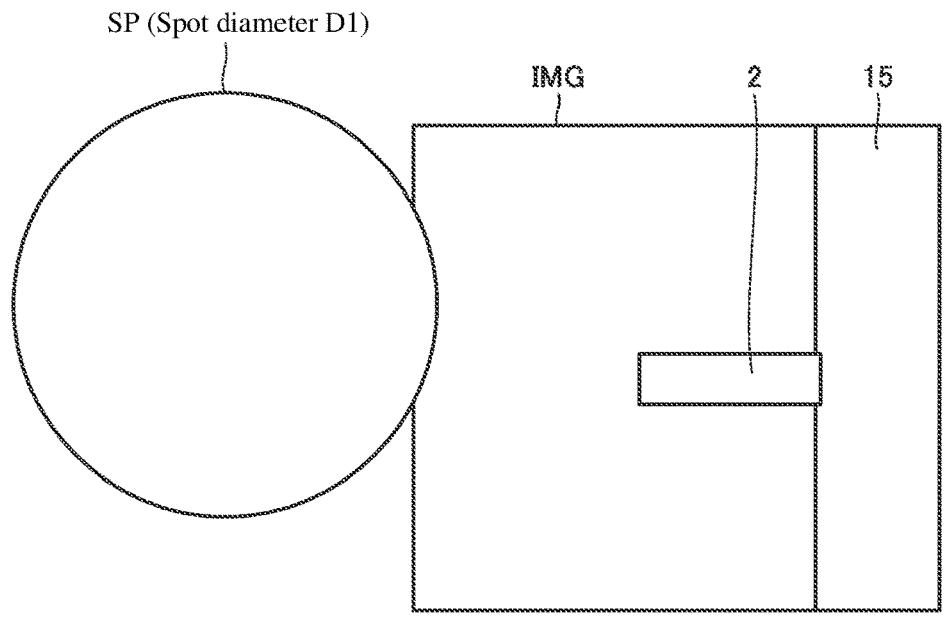
FIG. 6 is a diagram showing an example of a spot SP of a beam of laser light when adjusting an optical axis of laser light according to a first embodiment.

FIG. 6 is a diagram showing an example of a spot of a beam of laser light at the time of an optical axis adjustment of laser light according to a first embodiment. In the example of FIG. 6, at the time of the optical axis adjustment, the spot diameter D1 of the beam spot SP is set to be larger than the spot diameter D2 of the beam of the laser light of the laser light source 30 in the actual use. Thus, the spot SP is included in the captured image IMG.

Figure 7:
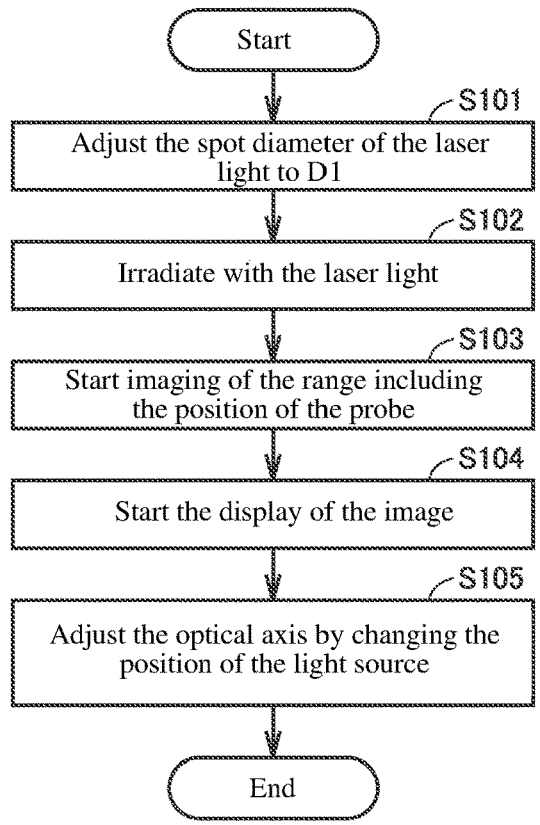
FIG. 7 is a flowchart showing an optical axis adjustment procedure of laser light according to the first embodiment.

FIG. 7 is a flowchart showing the optical axis adjustment procedure of the laser light according to the first embodiment. This optical axis adjustment is carried out, for example, when replacing the cantilever 2 and before measuring the physical properties of the sample 9.

In Step S101, the laser light adjustment unit 20 adjusts the spot diameter of the laser light to D1.

In Step S102, the laser light source 30 emits laser light. In Step S103, the imaging unit 10 starts imaging of the range including the position of the probe 7 at the time of the optical axis adjustment of the laser light.

In Step S104, the display unit 12 starts displaying the captured image generated by the imaging unit 10.

In Step S105, the drive mechanism 11 adjusts the optical axis of the laser light by changing the position of the laser light source 30 upon receipt of an instruction from the user through the operation unit 13.

As described above, according to this embodiment, at the time of the optical axis adjustment of the laser light, the spot diameter of the laser light is set to be larger than that at the time of measuring the sample. Therefore, the probability that the spot of the laser light can be captured in the captured image increases. Consequently, the user can perform the optical axis adjustment of the laser light while viewing the captured image.

Second Embodiment

Figure 8:
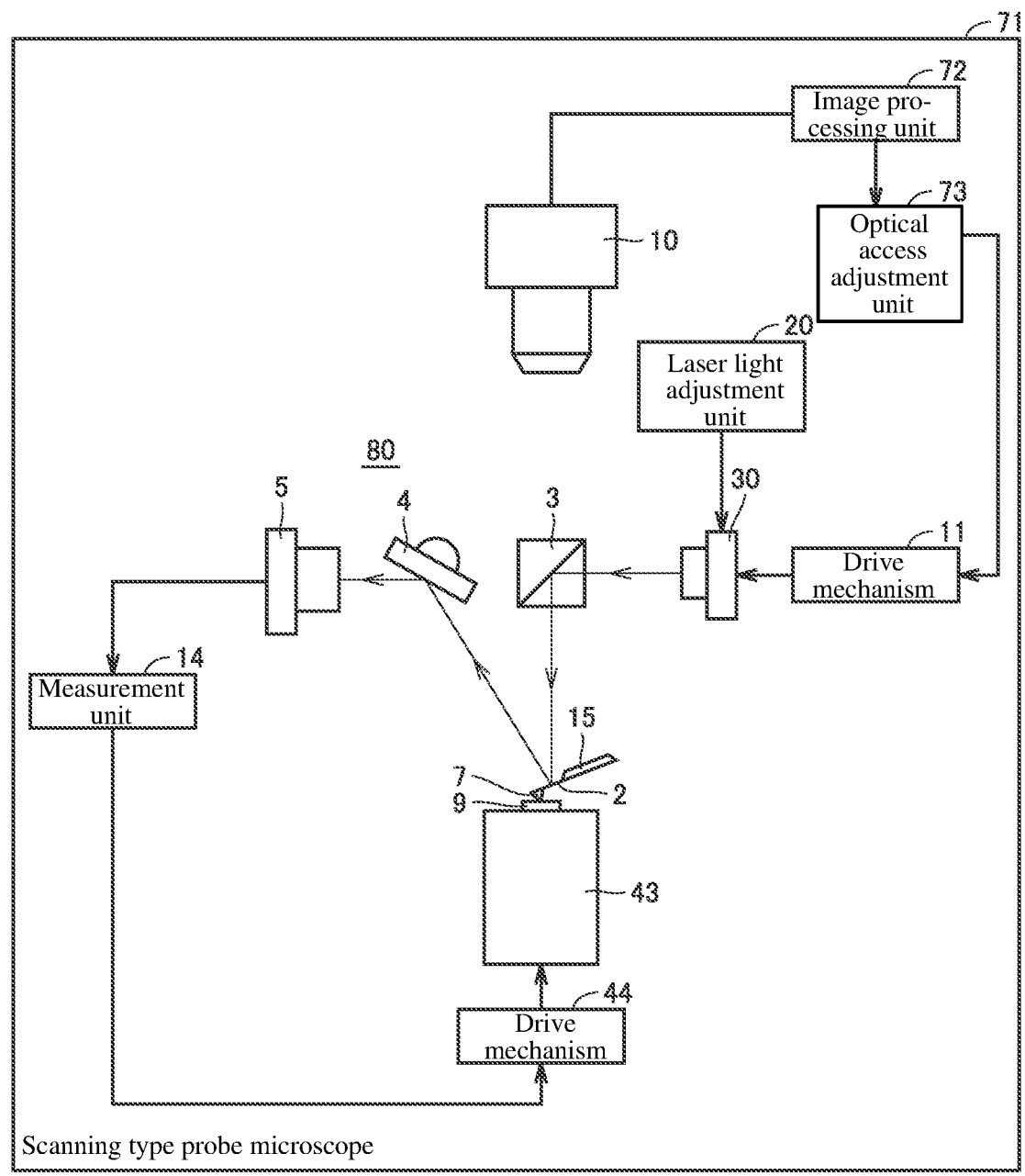
FIG. 8 is a diagram showing a configuration of a scanning type probe microscope 71 according to a second embodiment.

FIG. 8 is a diagram showing a configuration of a scanning type probe microscope 71 according to a second embodiment.

The scanning type probe microscope 71 of the second embodiment is different from the scanning type probe microscope 1 of the first embodiment in that the scanning type probe microscope 71 of the second embodiment is provided with an image processing unit 72 and an optical axis adjustment unit 73 instead of the operation unit 13.

The image processing unit 72 specifies the position of a part or an entirety of the spot SP of the laser light based on the captured image output from the imaging unit 10. For example, the image processing unit 72 may specify the area of white pixels which are the color of the spot SP of the laser light as the position of a part or an entirety of the spot SP of the laser light.

The optical axis adjustment unit 73 adjusts the optical axis by controlling the drive mechanism 11 based on the position of a part or an entirety of the spot SP of the laser light specified by the image processing unit 72 to change the position of the laser light source 30.

Figure 9:
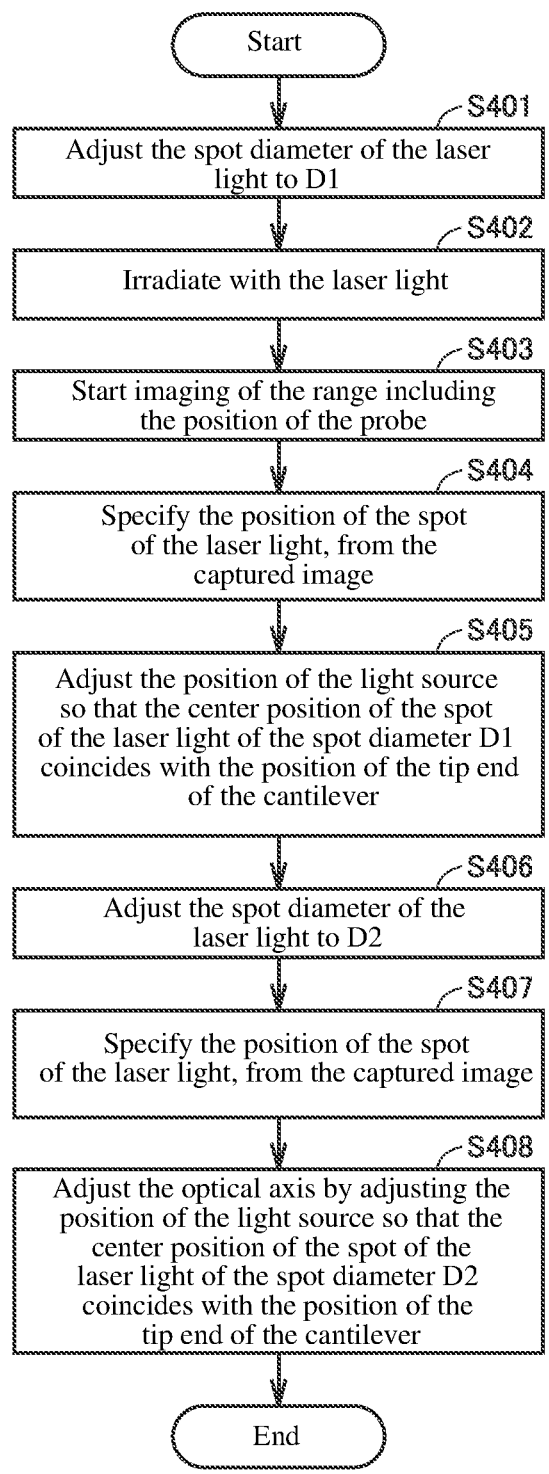
FIG. 9 is a flowchart showing an optical axis adjustment procedure of laser light according to the second embodiment.

FIG. 9 is a flowchart showing the optical axis adjustment procedure of the laser light of the second embodiment. This optical axis adjustment is carried out, for example, when replacing the cantilever 2 and before measuring the physical properties of the sample 9.

In Step S401, the laser light adjustment unit 20 adjusts the spot diameter of the laser light to D1.

In Step S402, the laser light source 30 emits laser light. In Step S403, the imaging unit 10 starts imaging of the range including the position of the probe 7 at the time of the optical axis adjustment of the laser light.

Figure 10:
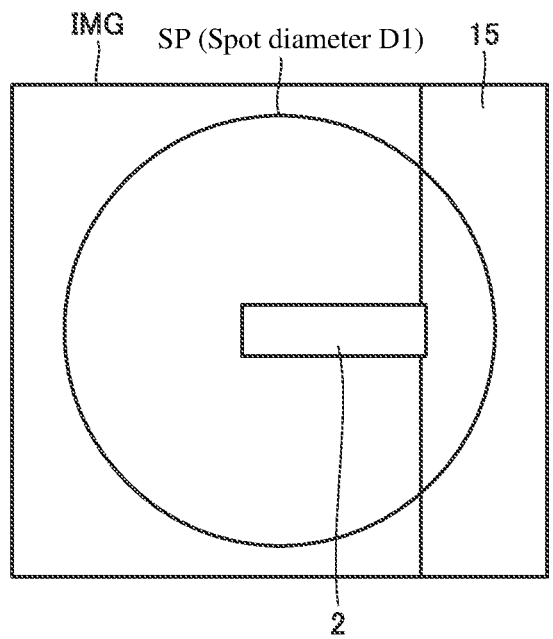
FIG. 10 is a diagram showing an example of a captured image when a spot diameter of laser light is D1 in the first embodiment.

In Step S404, the position of a part or an entirety of the spot SP of the laser light is specified based on the captured image output from the imaging unit 10. FIG. 10 is a diagram showing an example of a captured image when the spot diameter of the laser light is D1 in the first embodiment. Since the spot diameter D1 is large, the likelihood that the spot SP is included in the captured image increases.

In Step S405, the optical axis adjustment unit 73 outputs the control signal for controlling the drive mechanism 11 so that the center position of the spot SP of the laser light of the spot diameter D1 coincides with the position of the tip end of the cantilever 2 where the probe 7 is attached. The drive mechanism 11 adjusts the optical axis of the laser light by changing the position of the laser light source 30 according to a control signal. Here, since the spot diameter of the laser light is large, the optical axis is roughly adjusted.

In Step S406, the laser light adjustment unit 20 adjusts the spot diameter of the laser light to D2.

In Step S407, the position of the spot SP of the laser light is specified based on the captured image output from the imaging unit 10.

Figure 11:
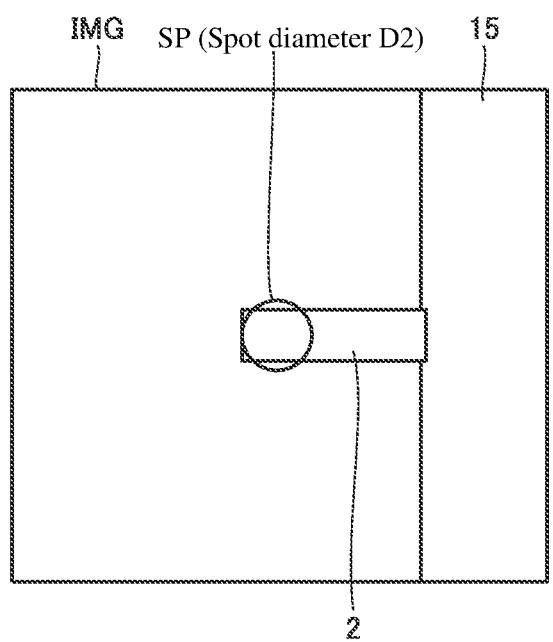
FIG. 11 is a diagram showing an example of a captured image after a precision adjustment of the optical axis of the laser light.

In Step S408, the optical axis adjustment unit 73 outputs a control signal for controlling the drive mechanism 11 so that the position of the center of the spot SP of the laser light of the spot diameter D2 coincides with the position of the tip end of the cantilever 2 where the probe 7 is attached. The drive mechanism 11 adjusts the optical axis of the laser light by changing the position of the laser light source 30 according to the control signal. Here, the spot diameter of the laser light is small, so the optical axis is precisely adjusted. FIG. 11 shows an example of a captured image after the precision adjustment of the optical axis of the laser light. According to this embodiment, the optical axis of the laser light can be adjusted correctly.

As described above, according to this embodiment, at the time of the optical axis adjustment, the spot diameter of the laser light is made to be larger than that at the time of the measurement of the sample. Therefore, it is possible to specify the spot position of the laser light in the captured image by performing image processing of the captured image. The optical axis of the laser light can be automatically adjusted by automatically moving the position of the laser light source 30 based on the specified spot position of the laser light.

Third Embodiment

Figure 12:
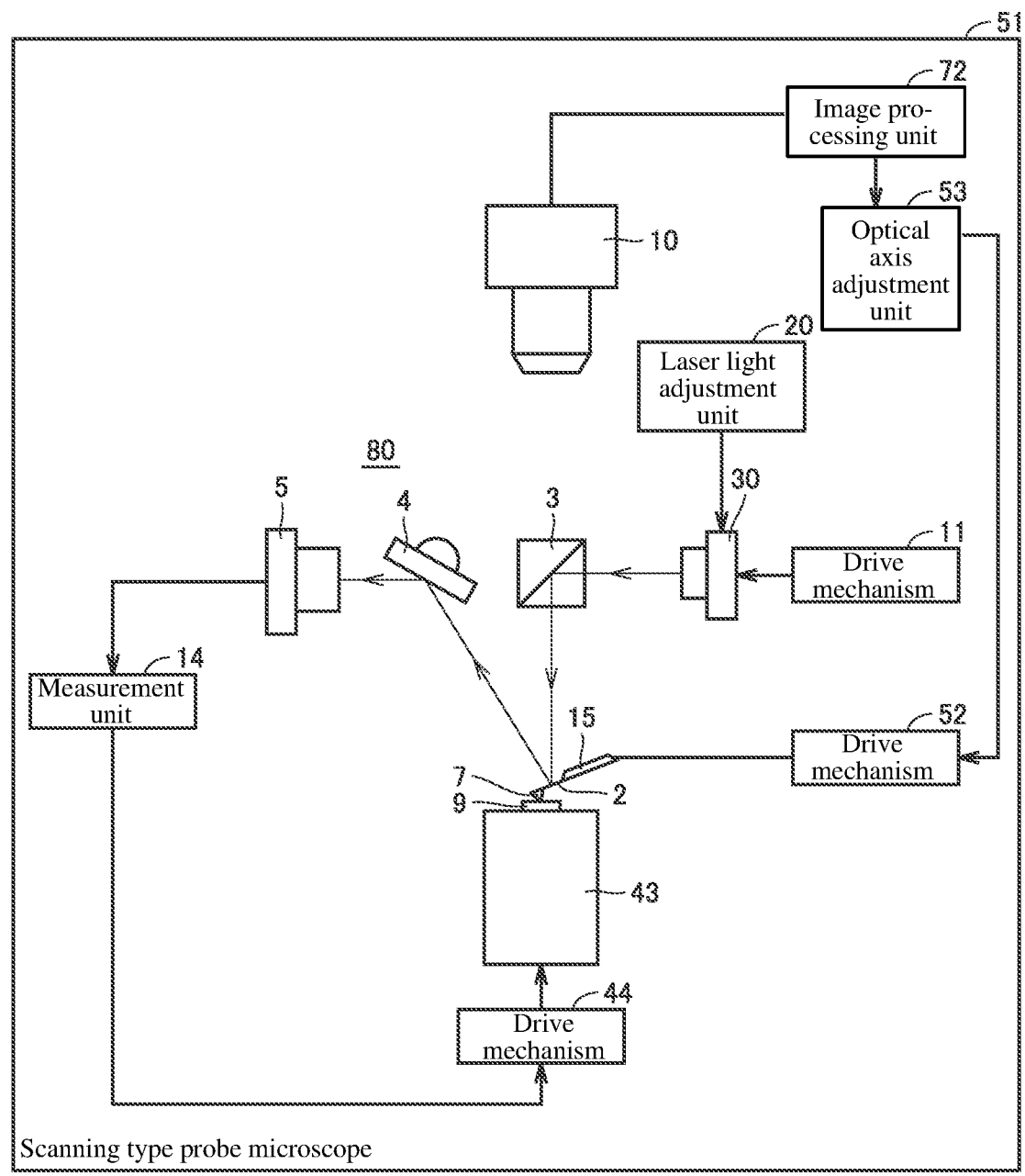
FIG. 12 is a diagram showing a configuration of a scanning type probe microscope 51 according to a third embodiment.

FIG. 12 is a diagram showing a configuration of a scanning type probe microscope 51 according to a third embodiment.

The scanning type probe microscope 51 of the third embodiment is different from the scanning type probe microscope 1 of the first embodiment in that the scanning type probe microscope 51 of the third embodiment is provided with an image processing unit 72, an optical axis adjustment unit 53, and a drive mechanism 52 instead of the operation unit 13.

The image processing unit 72 specifies the position of a part or an entirety of the spot SP of laser light based on the captured image output from the imaging unit 10.

The optical axis adjustment unit 53 adjusts the optical axis by changing the position of the holder 15 supporting the cantilever 2 by controlling the drive mechanism 52 based on the position of a part or an entirety of the spot SP of the laser light specified by the image processing unit 72.

The drive mechanism 52 adjusts the optical axis of the laser light by changing the position of the holder 15.

Figure 13:
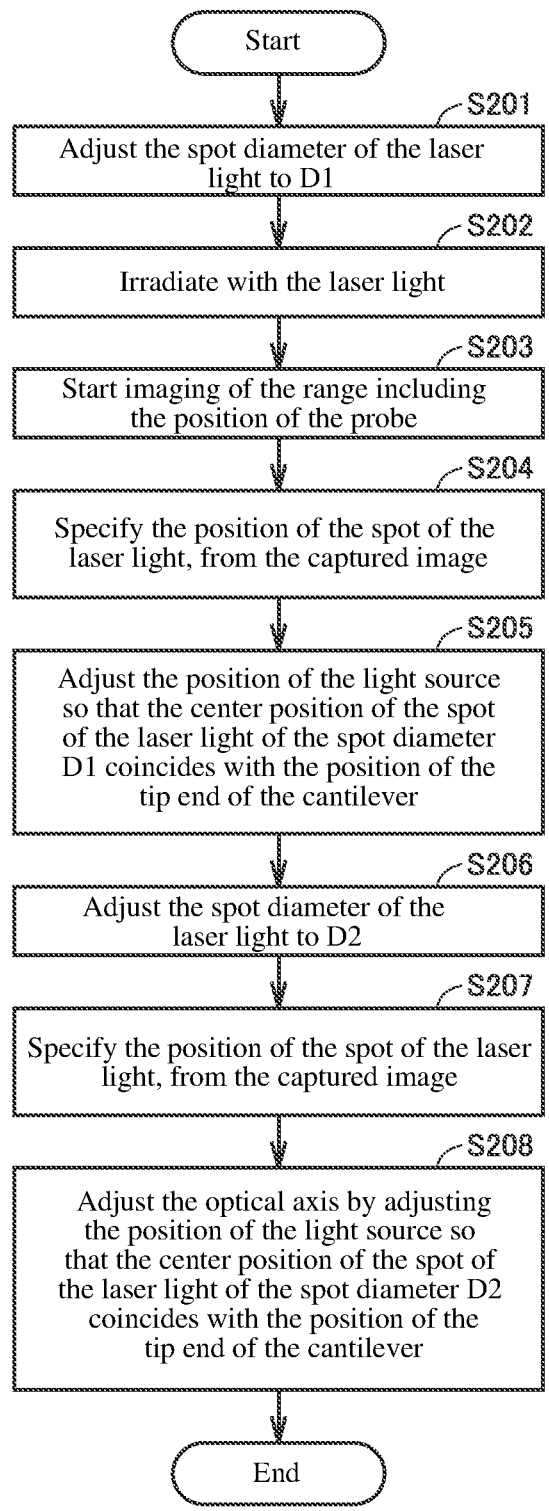
FIG. 13 is a flowchart showing an optical axis adjustment procedure of laser light according to the third embodiment.

FIG. 13 is a flowchart showing an optical axis adjustment procedure of laser light according to the third embodiment. This optical axis adjustment is carried out, for example, when replacing the cantilever 2 and before measuring the physical properties of the sample 9.

In Step S201, the laser light adjustment unit 20 adjusts the spot diameter of the laser light to D1.

In Step S202, the laser light source 30 emits laser light. In Step S203, the imaging unit 10 starts imaging of a range including the position of the probe 7 at the time of the optical axis adjustment of the laser light.

In Step S204, the position of a part or an entirety of the spot SP of the laser light is specified based on the captured image output from the imaging unit 10.

In Step S205, the optical axis adjustment unit 53 outputs a control signal for controlling the drive mechanism 52 so that the center position of the spot SP of the laser light of the spot diameter D1 coincides with the position of the tip end of the cantilever 2 where the probe 7 is attached. The drive mechanism 52 adjusts the optical axis of the laser light by changing the position of the holder 15 according to the control signal. Here, since the spot diameter of the laser light is large, the optical axis is roughly adjusted.

In Step S206, the laser light adjustment unit 20 adjusts the spot diameter of the laser light to D2.

In Step S207, the position of the spot SP of the laser light is specified based on the captured image output from the imaging unit 10.

In Step S208, the optical axis adjustment unit 73 outputs a control signal for controlling the drive mechanism 52 so that the center position of the spot SP of the laser light of the spot diameter D2 coincides with the position of the tip end of the cantilever 2 where the probe 7 is attached. The drive mechanism 52 adjusts the optical axis of the laser light by changing the position of the holder 15 according to the control signal. Here, the spot diameter of the laser light is small, so the optical axis is precisely adjusted.

As described above, according to this embodiment, at the time of the optical axis adjustment of the laser light, the spot diameter of the laser light is made to be larger than that when measuring the sample. Therefore, by performing image processing of the captured image, it is possible to specify the spot position of the laser light. The optical axis of the laser light can be automatically adjusted by automatically moving the position of the holder 15 holding the cantilever 2 based on the specified position of the spot of the laser light.

Fourth Embodiment

Figure 14:
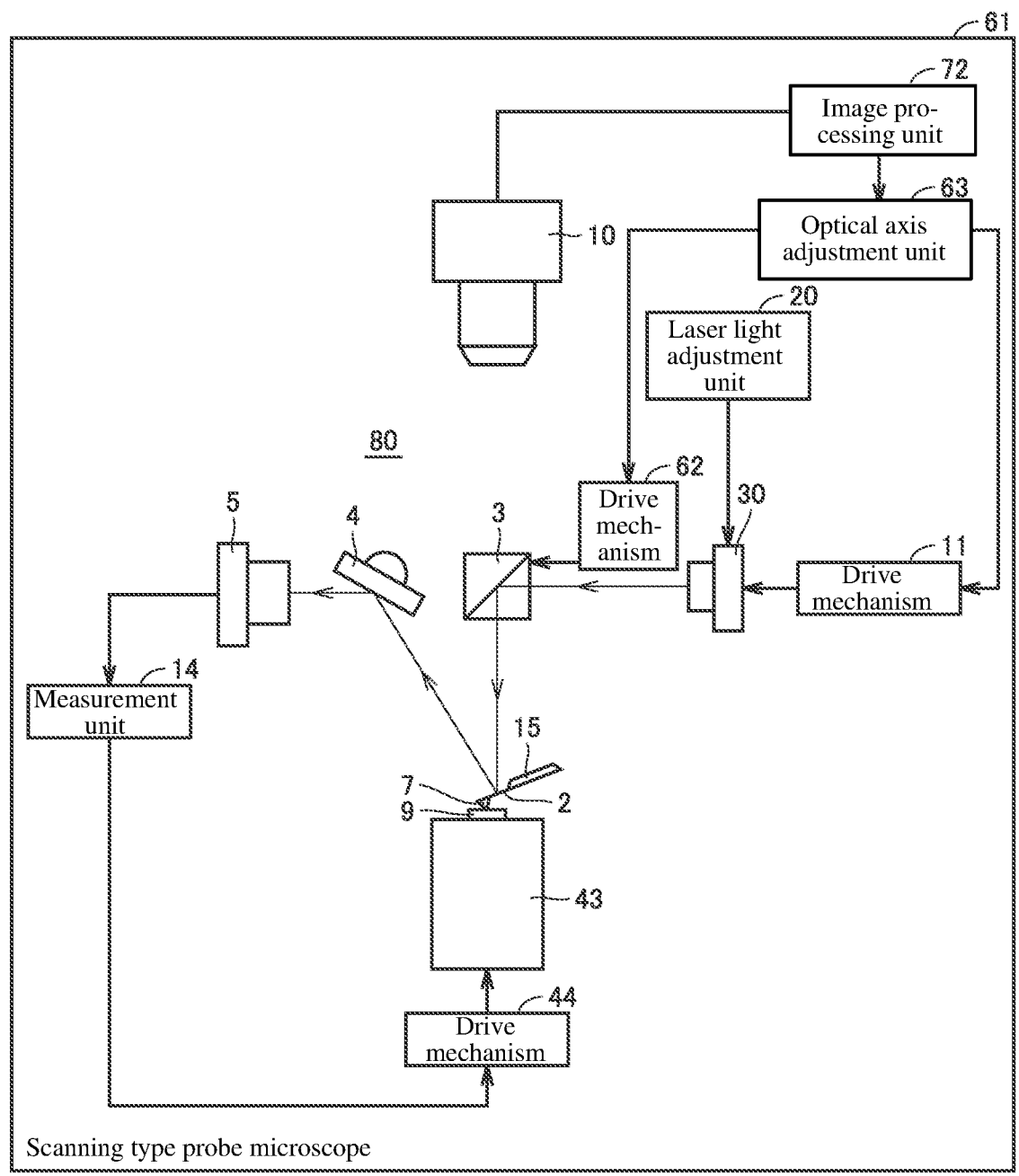
FIG. 14 is a diagram showing a configuration of a scanning type probe microscope 61 according to a fourth embodiment.

FIG. 14 is a diagram showing a configuration of a scanning type probe microscope 61 of a fourth embodiment.

The scanning type probe microscope 61 of the fourth embodiment differs from the scanning type probe microscope 1 of the first embodiment in that the scanning type probe microscope 61 of the fourth embodiment is provided with an image processing unit 72, an optical axis adjustment unit 63, and a drive mechanism 62 instead of the operation unit 13.

The image processing unit 72 specifies a position of a part or an entirety of the spot SP of the laser light based on the captured image output from the imaging unit 10.

The optical axis adjustment unit 63 adjusts the optical axis by changing the position of the beam splitter 3 by controlling the drive mechanism 62 based on the position of a part or an entirety of the spot SP of the laser light specified by the image processing unit 72.

The drive mechanism 62 adjusts the optical axis of the laser light by changing the position of the beam splitter 3.

Figure 15:
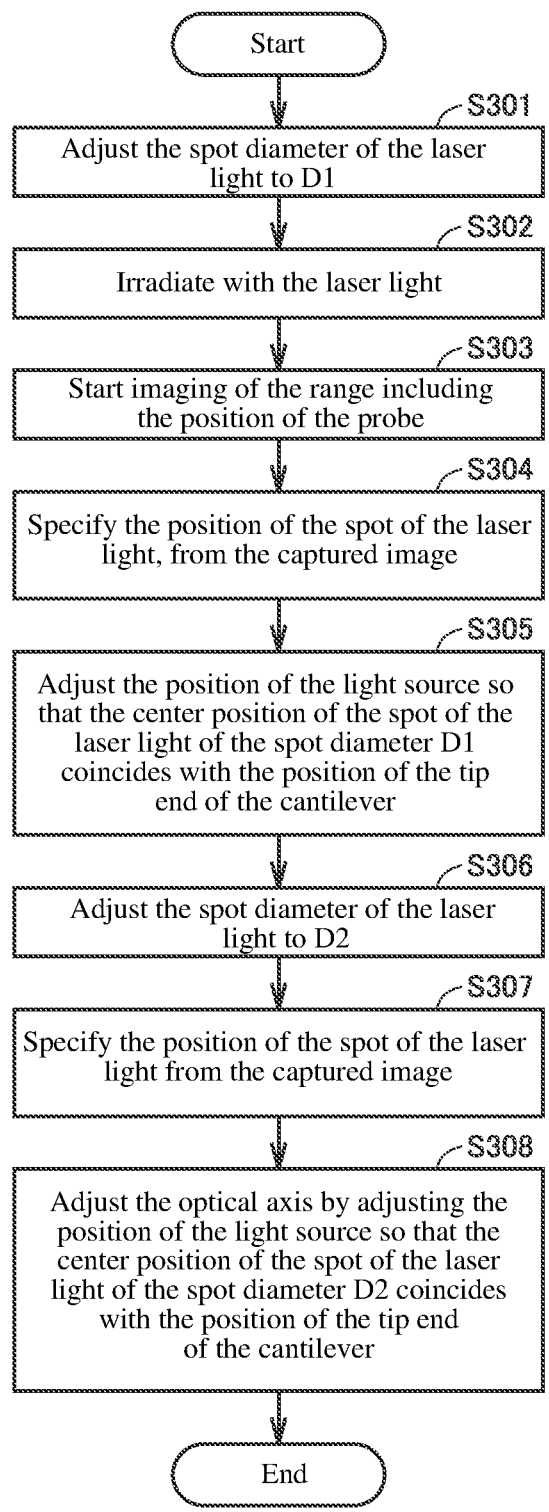
FIG. 15 is a flowchart showing an optical axis adjustment procedure of the laser light of according to the fourth embodiment.

FIG. 15 is a flowchart showing the optical axis adjustment procedure of the laser light according to the fourth embodiment. This optical axis adjustment is carried out, for example, when replacing the cantilever 2 and before measuring the physical properties of the sample 9.

In Step S301, the laser light adjustment unit 20 adjusts the spot diameter of the laser light to D1.

In Step S302, the laser light source 30 emits laser light. In Step S303, the imaging unit 10 starts imaging of a range including the position of the probe 7 at the time of the optical axis adjustment of the laser light.

In Step S304, the position of a part or an entirety of the spot SP of the laser light is specified based on the captured image output from the imaging unit 10.

In Step S305, the optical axis adjustment unit 53 outputs a control signal for controlling the drive mechanism 62 so that the position of the center of the spot SP of the laser light of the spot diameter D1 coincides with the position of the tip end of the cantilever 2 where the probe 7 is attached. The drive mechanism 62 adjusts the optical axis of the laser light by changing the position of the beam splitter 3 according to a control signal. Here, the spot diameter of the laser light is large, so the optical axis is roughly adjusted.

In Step S306, the laser light adjustment unit 20 adjusts the spot diameter of the laser light to D2.

In Step S307, the position of the spot SP of the laser light is specified based on the captured image output from the imaging unit 10.

In Step S308, the optical axis adjustment unit 73 outputs a control signal for controlling the drive mechanism 62 so that the center position of the spot SP of the laser light of the spot diameter D2 coincides with the position of the tip end of the cantilever 2 where the probe 7 is attached. The drive mechanism 62 adjusts the optical axis of the laser light by changing the position of the beam splitter 3 according to a control signal. Here, the spot diameter of the laser light is small, so the optical axis is precisely adjusted.

As described above, according to this embodiment, at the time of the optical axis adjustment of the laser light, since the spot diameter of the laser light is made to be larger than that when measuring the sample by performing image processing of the captured image, it is possible to specify the spot position of the laser light. The optical axis of the laser light can be automatically adjusted by automatically moving the position of the beam splitter 3 that reflects the laser light, based on the specified spot position of the laser light.

Fifth Embodiment

In this embodiment, the control function of a scanning type probe microscope of the second embodiment is provided in a different control device separated from that of the scanning type probe microscope.

Figure 16:
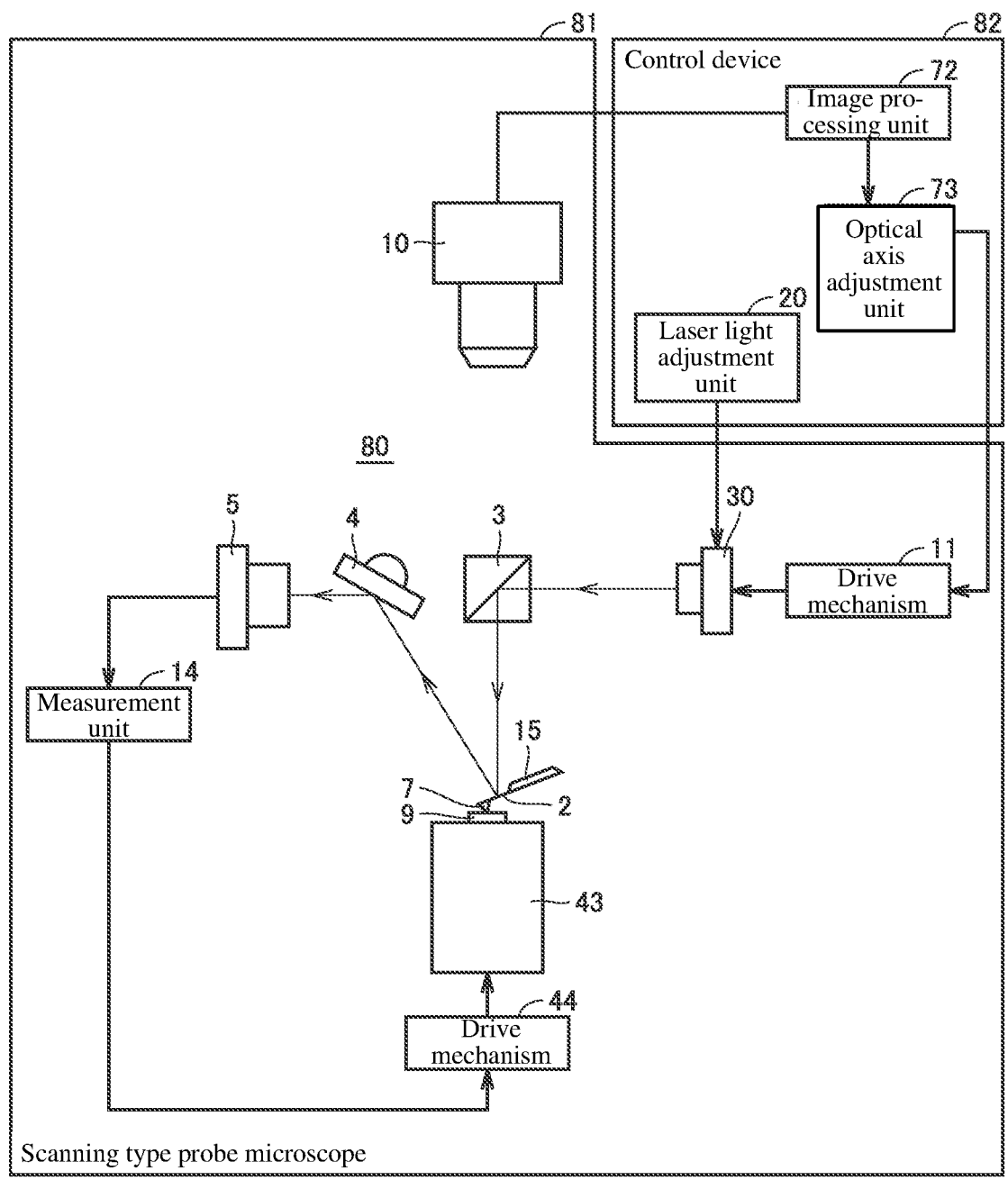
FIG. 16 is a diagram showing a configuration of a measuring system according to a fifth embodiment.

FIG. 16 is a diagram showing a configuration of a measuring system according to a fifth embodiment. The measuring system is provided with a scanning type probe microscope 81 and a control device 82 for controlling the scanning type probe microscope 81.

The scanning type probe microscope 81 is provided with components other than the laser light adjustment unit 20, the image processing unit 72, and the optical axis adjustment unit 73 among all components of the scanning type probe microscope 71 of the second embodiment.

The control device 82 is provided with the laser light adjustment unit 20, the image processing unit 72, and the optical axis adjustment unit 73.

In this embodiment, even if the control function in the scanning type probe microscope of the second embodiment is provided in a different control device separated from the scanning type probe microscope, the same effects as those of the second embodiment can be obtained.

Note that, even if the control function in the scanning type probe microscopes of the first, third, or fourth embodiments is provided in a different control device separated from the scanning type probe microscope, the same effects as those of the first, third, or fourth embodiments can be obtained.

[Modifications]

The present invention is not limited to the above-mentioned embodiments, and includes, for example, the following modifications.

(1) Cantilever Configuration

Figure 17:
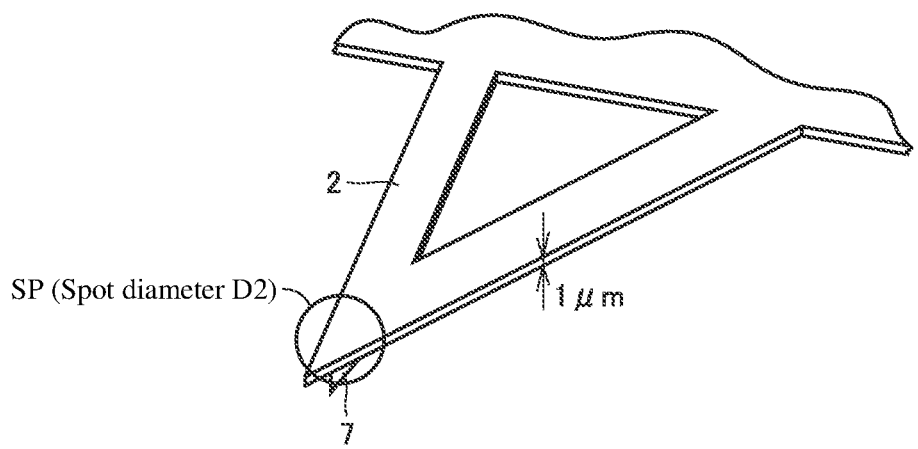
FIG. 17 is a diagram showing an example of a configuration of a cantilever 2.
Figure 18:
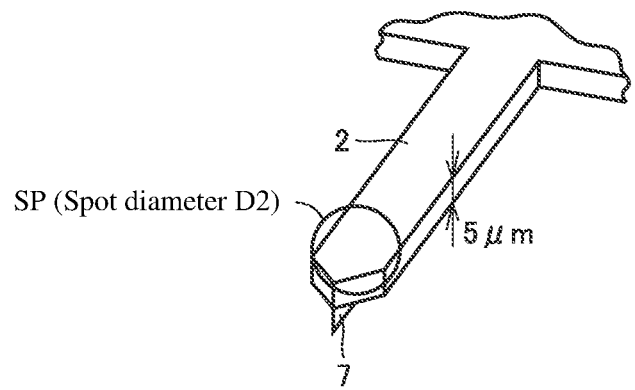
FIG. 18 is a diagram showing another example of a configuration of a cantilever 2.

FIG. 17 is a diagram showing an example of a configuration of the cantilever 2. FIG. 18 is a diagram showing another example of a configuration of the cantilever 2. In both cases, a probe 7 is provided on the tip end of the cantilever 2. In measuring the physical properties of a sample, the optical axis of the laser light is adjusted so that the spot SP of the laser light of the spot diameter D2 is brought near the tip end where the probe 7 of the cantilever 2 is provided.

(2) Image Processing Unit and Optical Axis Adjustment Unit

Figure 19:
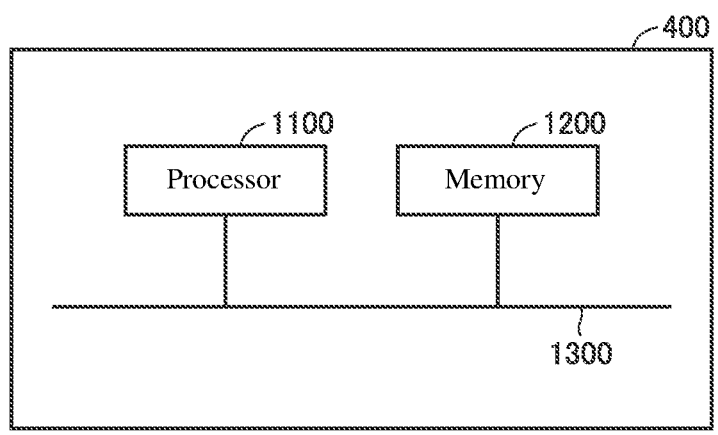
FIG. 19 is a diagram showing an example of a hardware configuration of an image processing unit 72 and an optical axis adjustment unit 73.

FIG. 19 is a diagram showing an example of a hardware configuration of the image processing unit 72 and the optical axis adjustment unit 73. The hardware of the image processing unit 72 and the optical axis adjustment unit 73 of FIG. 8 is provided with a processor 1100 and a memory 1200 connected to the processor 1100 via a bus 1300.

The image processing unit 72 and the optical axis adjustment unit 73 are realized by a processor 1100, such as, e.g., a CPU (Central Processing Unit), executing a program stored in the memory 1200. Note that a plurality of processors and a plurality of memories may be combined to perform the functions of the above components. The same can be applied to the image processing unit 72 and the optical axis adjustment unit 53 of FIG. 12, the image processing unit 72 and the optical axis adjustment unit 63 of FIG. 14, the image processing unit 72 and the optical axis adjustment unit 73 of FIG. 16.

The embodiments disclosed herein are to be considered in all respects as illustrative and not restrictive. The scope of the present invention is indicated by the appended claims rather than by the foregoing descriptions, and is intended to include all modifications within the meanings and ranges equivalent to the scope of the claims.

DESCRIPTION OF SYMBOLS 1, 51, 61, 71, 81: Scanning type probe microscope
2: Cantilever
3: Beam splitter
4: Reflector
5: Photodetector
7: Probe
9: Sample
10: Imaging unit
11, 44, 52, 62: Drive mechanism
12: Display unit
13: Operation unit
14: Measurement unit
15: Holder
20: Laser light adjustment unit
30: Laser light source
43: Scanner
72: Image processing unit
53, 63, 73: Optical axis adjustment unit
80: Optical system
82: Control device

The invention claimed is:

1. A scanning type probe microscope comprising:
a cantilever provided on a tip end thereof with a probe;
an optical system configured to emit laser light to the cantilever and detect the laser light reflected by the cantilever;
a measurement unit configured to measure characteristics of a sample based on a displacement of the cantilever obtained by a change in a position of the laser light detected by the optical system;
a laser light adjustment unit configured to adjust, when adjusting an optical axis of the laser light, a spot diameter of the laser light to be larger than the spot diameter when measuring the characteristics of the sample;
an imaging unit configured to capture an image of a range including a position of the probe when adjusting the optical axis of the laser light; and
a display unit configured to display the image captured by the imaging unit.

2. A scanning type probe microscope comprising:
a cantilever provided on a tip end thereof with a probe;
an optical system configured to emit laser light to the cantilever and detect the laser light reflected by the cantilever;
a measurement unit configured to measure characteristics of a sample based on a displacement of the cantilever obtained by a change in a position of the laser light detected by the optical system;
a laser light adjustment unit configured to adjust, when adjusting an optical axis of the laser light, a spot diameter of the laser light to be larger than that of the spot diameter when measuring the characteristics of the sample;
an imaging unit configured to capture an image of a range including a position of the probe when adjusting the optical axis of the laser light;
an image processing unit configured to specify a position of a part or an entirety of the spot of the laser light in the image captured by the imaging unit; and
an optical axis adjustment unit configured to adjust an optical axis of the laser light based on the specified position.

3. The scanning type probe microscope as recited in claim 2,
wherein the optical system includes:
a light source configured to emit laser light;
a photodetector configured to detect the laser light;
a first mirror configured to reflect the laser light emitted from the light source toward the cantilever; and
a second mirror configured to reflect the laser light reflected by the cantilever toward the photodetector.

4. The scanning type probe microscope as recited in claim 3,
wherein the optical axis adjustment unit adjusts the optical axis of the laser light by moving the position of the light source based on the specified position.

5. The scanning type probe microscope as recited in claim 3,
wherein the optical axis adjustment unit adjusts the optical axis of the laser light by moving the position of the cantilever based on the specified position.

6. The scanning type probe microscope as recited in claim 3,
wherein the optical axis adjustment unit adjusts the optical axis of the laser light by moving the position of the first mirror based on the specified position.

7. The scanning type probe microscope as recited in claim 2,
wherein the laser light adjustment unit adjusts intensity of the laser light when adjusting the optical axis of the laser light to be equal to or higher than a sensitivity limit of the imaging unit.

8. The scanning type probe microscope as recited in claim 2,
wherein the optical axis adjustment unit adjusts the optical axis of the laser light so that a position of the center of the spot of the laser light coincides with the position of a tip end of the cantilever in the image.

9. The scanning type probe microscope as recited in claim 7,
wherein, after the adjustment, the laser light adjustment unit further adjusts the spot diameter of the laser light to be equal to the spot diameter when measuring the characteristics of the sample, and
wherein the optical axis adjustment unit adjusts the optical axis of the laser light such that the position of the center of the narrowed laser light coincides with the position of the tip end of the sample in the image.

10. The scanning type probe microscope as recited in claim 2,
wherein the image processing unit specifies a position of the part or the entirety of the spot of the laser light based on a color of the pixel in the image.

11. A control device for a scanning type probe microscope,
wherein the scanning probe microscope comprises:
a cantilever provided on a tip end thereof with a probe;
an optical system configured to emit laser light to the cantilever and detect the laser light reflected by the cantilever;
a measurement unit configured to measure characteristics of a sample based on a displacement of the cantilever obtained by a change in a position of the laser light detected by the optical system; and
an imaging unit configured to capture an image of a range including a position of the probe when adjusting the optical axis of the laser light,
wherein the control device includes:
a laser light adjustment unit configured to adjust, when adjusting the optical axis of the laser light, a spot diameter of the laser light to be larger than the spot diameter when measuring the characteristics of the sample;
an image processing unit configured to specify a position of a part or an entirety of the spot of the laser light in the image captured by the imaging unit; and
an optical axis adjustment unit configured to adjust the optical axis of the laser light based on the specified position.

* * * * *